US00RE35173E

United States Patent [19]

Delzio

[11] E Patent Number: Re. 35,173

[45] Reissued Date of Patent: Mar. 12, 1996

[54] CAT SCRATCHING POST FEEDER

[76] Inventor: Robert J. Delzio, 9733 Caminito Doha, San Diego, Calif. 92131

[21] Appl. No.: 212,988

[22] Filed: Mar. 15, 1994

Related U.S. Patent Documents

Reissue of:

[64] Patent No.: 5,113,795
Issued: May 19, 1992
Appl. No.: 680,933
Filed: Apr. 5, 1991

U.S. Applications:

[63] Continuation-in-part of Ser. No. 549,921, Jul. 9, 1990, abandoned.

[51] Int. Cl.[6] ..... A01K 1/10

[52] U.S. Cl. ..... 119/51.01; 119/54; 119/706

[58] Field of Search ..... 119/51.01, 706, 119/53.5, 54, 70, 29

[56] References Cited

U.S. PATENT DOCUMENTS

| | | | |
|---|---|---|---|
| 1,309,090 | 7/1919 | Henson | 119/54 |
| 2,795,210 | 6/1957 | Eronen | 119/51.01 |
| 2,997,019 | 8/1961 | Bryson | 119/29 |
| 3,604,397 | 9/1971 | Salerno | 119/29 |
| 4,177,763 | 12/1979 | Cook | 119/29 |
| 4,676,197 | 6/1987 | Hoover | 119/54 X |
| 4,799,455 | 1/1989 | O'Kelley | 119/51.01 |

*Primary Examiner*—Nicholas D. Lucchesi

[57] ABSTRACT

A [cat] scratching post feeder comprising a [dry food filled inner cylinder] *first shell able to receive food* with a [spring-loaded lower lid] *tension-loaded door* and a [carpeted outer cylinder] *second shell with a surface that cats like to scratch* that slides over the [inner cylinder] *first shell* and rests upon the [inner cylinder's lower lid steel support rod] *first shell's door support element.* The [carpeted outer cylinder] *second shell with a surface that cats like to scratch* rests directly upon the [lower lid's protruding steel support rod] *door support element.* Scratching action of a cat upon [carpeted outer cylinder] *the second shell with a surface that cats like to scratch* exerts downward force through the [steel support rod] support element to the [spring-loaded lower lid] *tension-loaded door* causing the [lower lid] *door* to open and dispense [dry cat] food. The [cat] scratching post feeder can be mounted to a fixed wall or [mounted to a free standing base] *configured as a free standing unit.* The [cat] scratching post feeder is a dual function device acting as a scratching post and as a pet-activated feeder.

12 Claims, 8 Drawing Sheets

CAT SCRATCHING POST FEEDER

Matter enclosed in heavy brackets [ ] appears in the original patent but forms no part of this reissue specification; matter printed in italics indicates the additions made by reissue.

CONTINUATION IN PART

This application is a continuation in part of U.S. patent application Ser. No. 07/549,921, filed Jul. 9, 1990 now abandoned.

BACKGROUND OF THE INVENTION

Cat scratching posts have been in existence for many years. Ideally, a scratching post is used exclusively by a cat to sharpen its claws, thereby preserving valuable furniture, carpeting, and garments which would otherwise be the likely target of the cat. However, convincing a cat to sharpen its claws on the scratching post has always been a most difficult task.

The cat scratching post feeder, the invention disclosed herein, is designed to provide the cat with the necessary incentive to use a scratching post. Any scratching motion by a cat upon the cat scratching post feeder will automatically release dry cat food as an incentive or reward for the cat.

Mechanical feeders for animals do exist. One such apparatus is shown in U.S. Pat. No. 4,676,197. In this apparatus, the intent is to feed hogs and like animals on a programmed basis. The cited invention relates generally to animal husbandry.

Scratching posts for cats also exist. Examples are shown in U.S. Pat. Nos. 2,997,019; 3,604,397; and 4,177,763. However. to date, no device has existed as the herein disclosed cat scratching post feeder. This invention serves a unique dual function; cat scratching post and simultaneous pet-activated feeder.

OBJECTS AND SUMMARY OF THE INVENTION

An object of this invention is to provide a cat scratching post with an effective incentive for actual use by cats. That incentive is the delivery of dry food to the cat in recognition of the cat's use of the scratching post. This invention, the cat scratching post feeder, provides a much higher probability of actual use of the scratching post, by cats, as compared to prior art units which offer solely a scratching surface for the cat without any added incentive.

A further object of this invention is to provide a self-feeding apparatus for cats. The dry food storage section of the cat scratching post can hold up to seven days supply of dry food.

DETAILED DESCRIPTION OF THE PREFERRED EMBODIMENT

Figure 1:
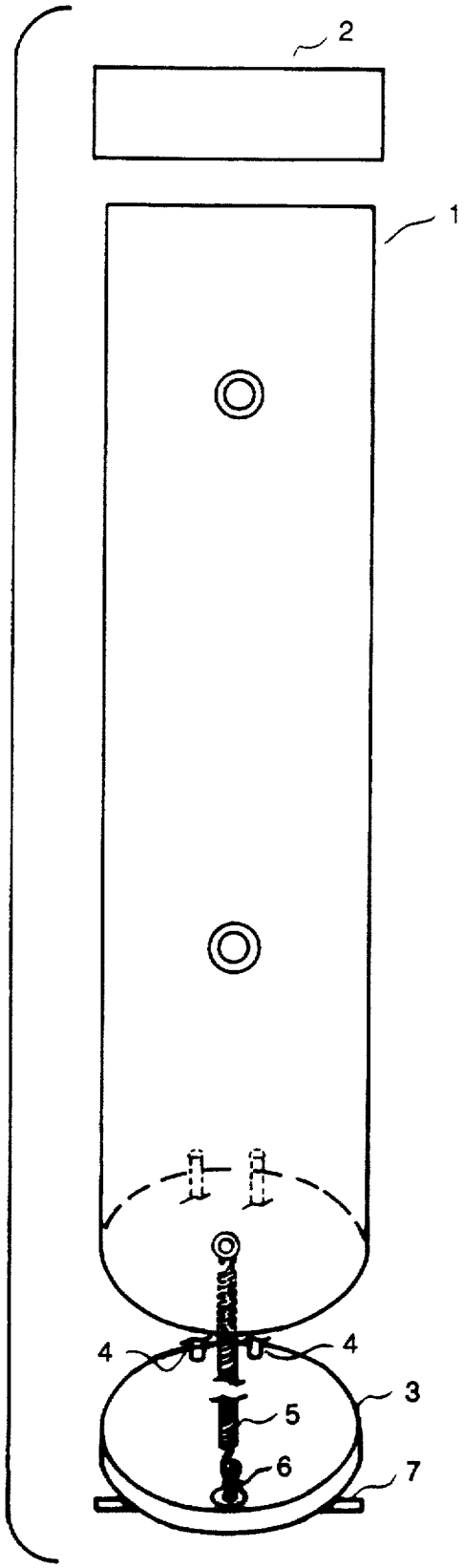
FIG. 1 is an exploded front view of the inner cylinder structure of the invention.

Referring in more detail to the drawings, there is shown the inner cylinder 1 with the lower lid 3 attached to the inner cylinder 1 by two plastic cable ties 4 forming a hinging mechanism. Also attached between the inner cylinder 1 and the lower lid 3 by means of two riveted hooks 6, is one extension spring 5.

Figure 7:
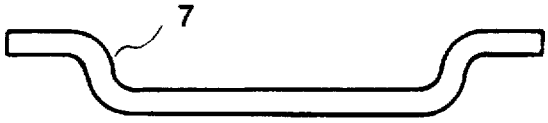
FIG. 7 is the front view of the steel support rod which is riveted to the underside of the inner cylinder lower lid.
Figure 8:
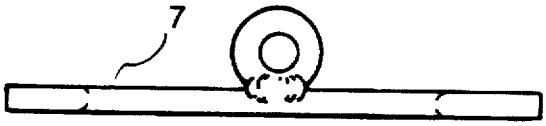
FIG. 8 is the top view of the steel support rod which is riveted to the underside of the inner cylinder lower lid.
Figure 9:
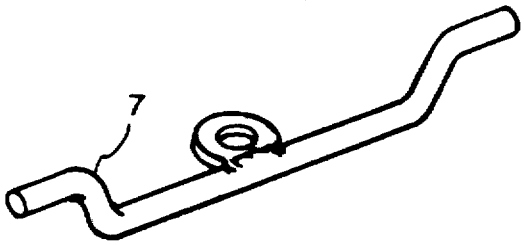
FIG. 9 is the isometric view of the steel support rod which is riveted to the underside of the inner cylinder lower lid.

Riveted to the underside of the hinged, spring-loaded lower lid 3 is the steel support rod 7. It is a steel rod with a weld-attached metal washer for single rivet fastening to the underside of the inner cylinder's lower lid 3, and is shaped with upward and outward bends at each of its two ends so as to follow the contour of the underside and sides of the lower lid 3 and protrude outward from the lower lid 3 thereby supporting the carpeted outer cylinder 13. Refer to FIGS. 7, 8, and 9 for detailed rendering of the steel support rod 7.

The invention, the cat scratching post feeder, can be mounted in one of two ways; wall mount and free standing. Both mounting methods require that the inner cylinder 1 first be securely mounted. Then, the carpeted outer cylinder 13 can be easily slid over the stationary inner cylinder 1.

Wall mounted

Figure 2:
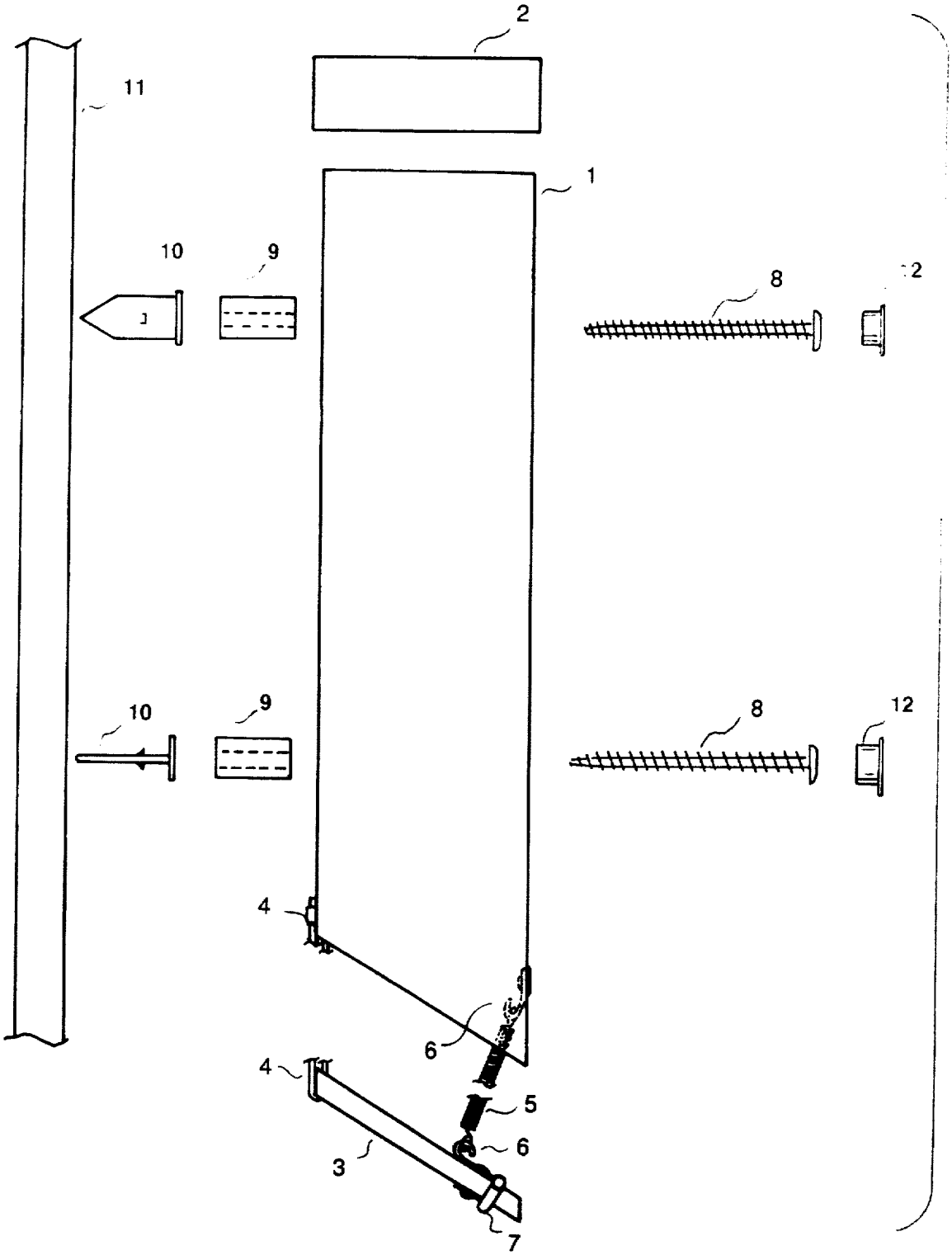
FIG. 2 is an exploded right side view of the inner cylinder structure of the invention, showing wood screws, plastic spacers and wall anchors for wall mounting.
Figure 3:
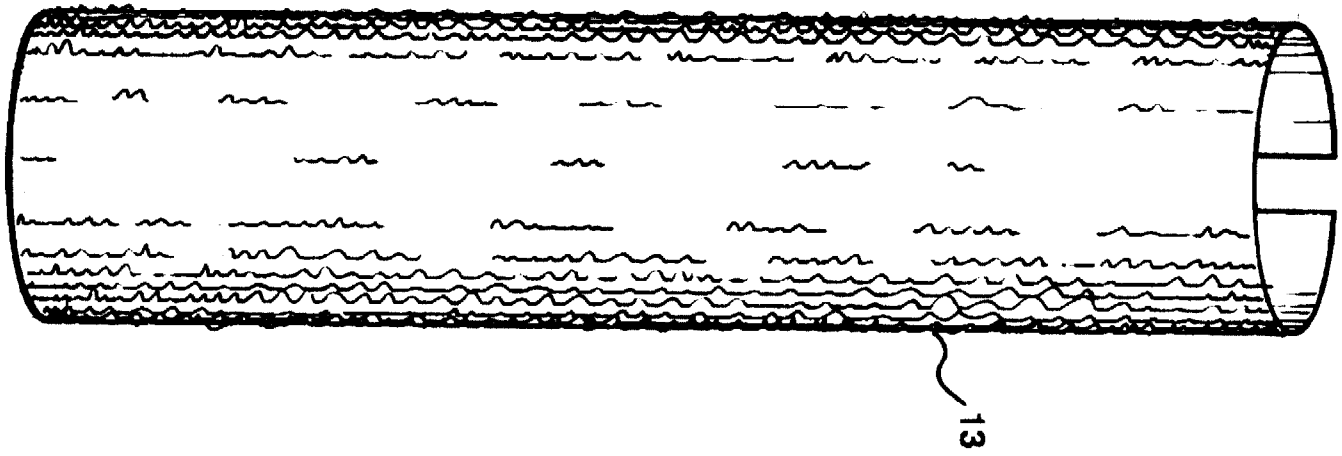
FIG. 3 is the front view of the carpeted outer cylinder structure of the invention.
Figure 4:
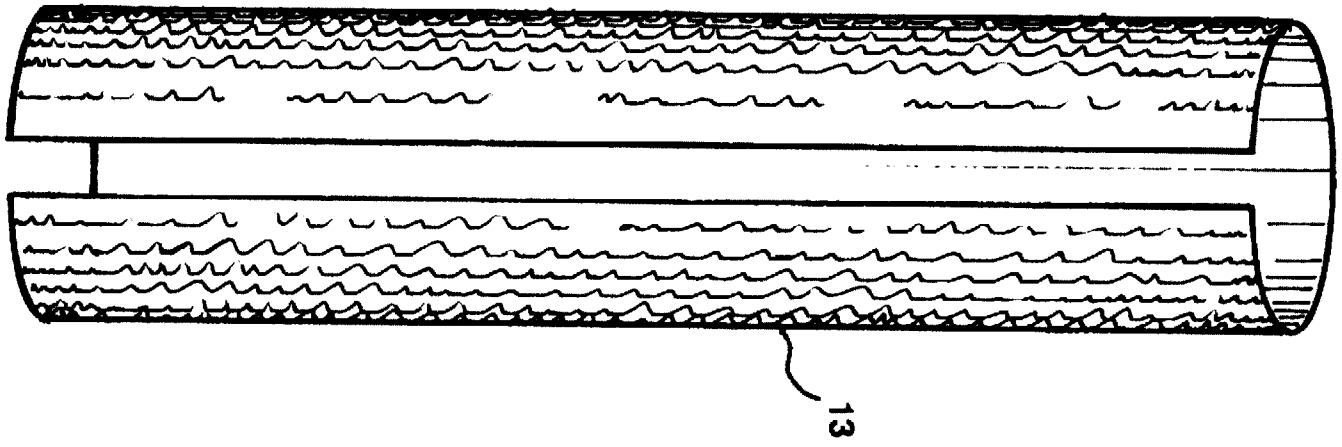
FIG. 4 is the back view of the carpeted outer cylinder structure of the invention.
Figure 5:
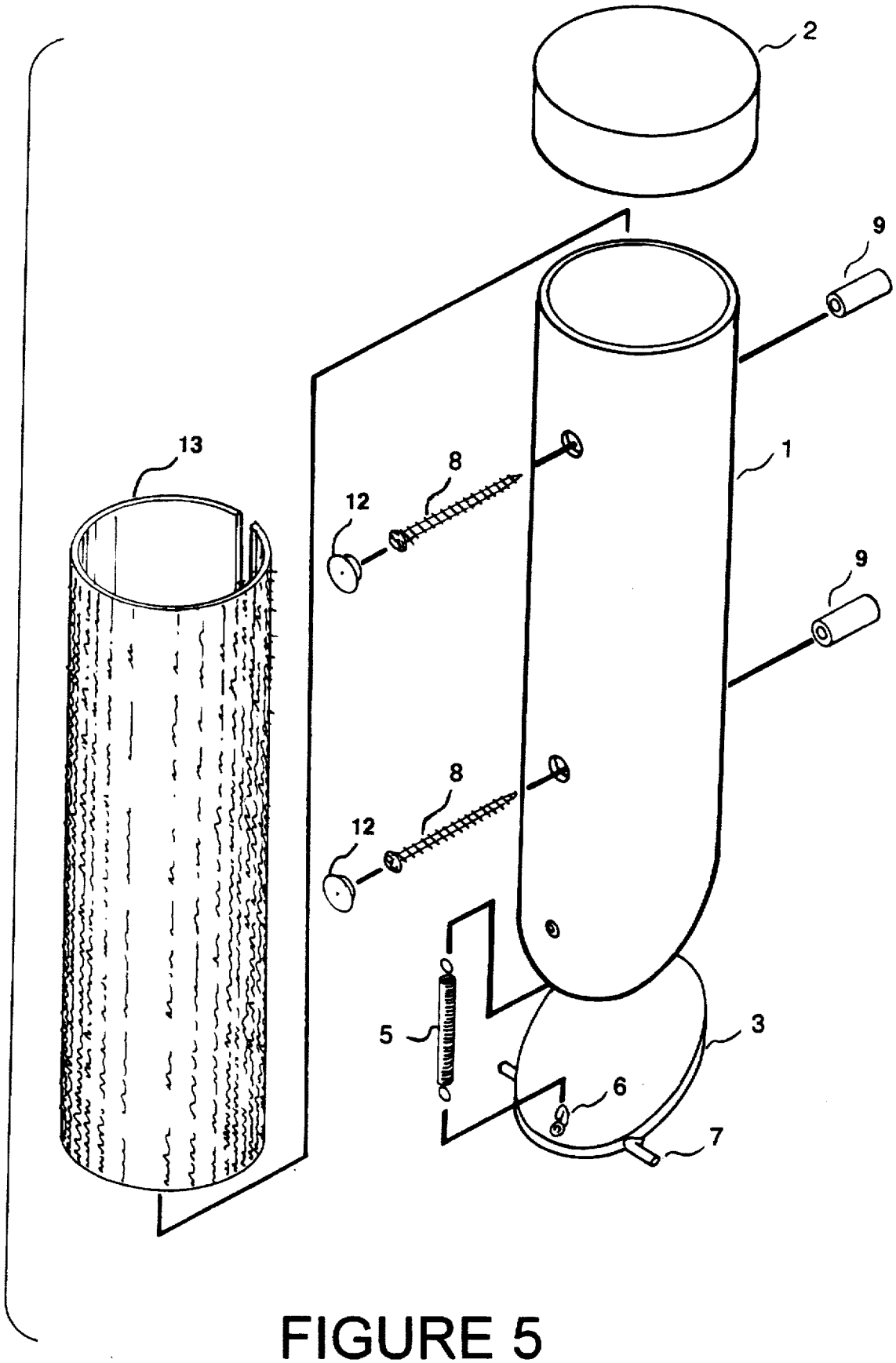
FIG. 5 is the exploded isometric view of the complete scratching post feeder prior to mounting.
Figure 6:
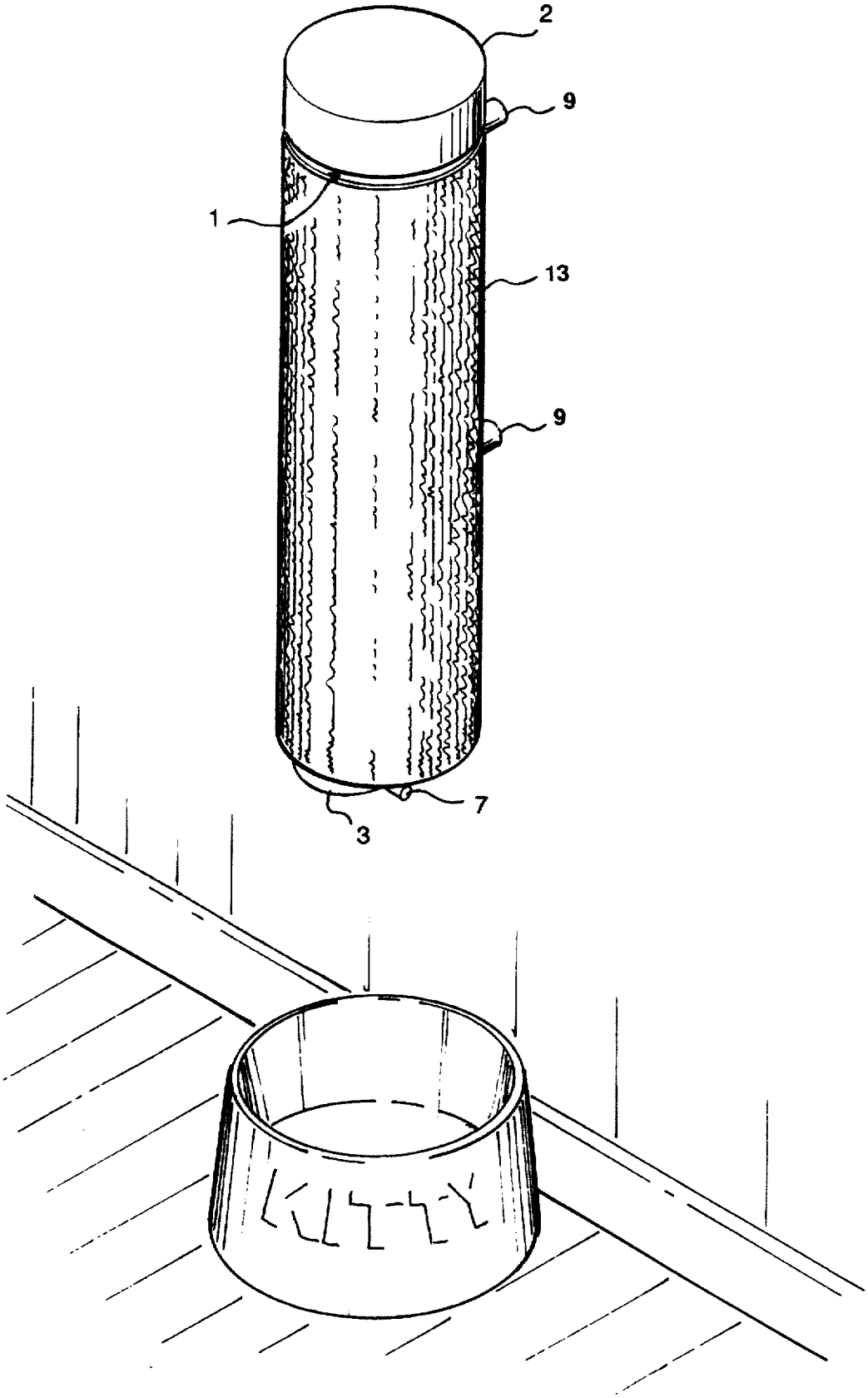
FIG. 6 is the isometric view of the complete and assembled scratching post feeder mounted to a wall.

The inner cylinder 1 is secured to a wall 11 (see FIGS. 2, 5, 6). The two hollow wall anchors 10 are required when mounting to a hollow wall. That is, a wall in which the framing studs cannot be located or utilized. The two plastic spacers 9 are used to maintain a fixed distance between the wall 11 and the inner cylinder 1. This spacing is required so that the carpeted outer cylinder 13 can slide over the secured inner cylinder 1. The two wood screws 8 slide through pre-drilled holes of the inner cylinder 1 and on through the two plastic spacers 9 and into the wall 11.

FIG. 1 shows the predrilled holes in a front view of the inner cylinder 1, with larger 0.5 inch diameter holes in the front of cylinder 1, and smaller 0.25 inch diameter holes in the rear of cylinder 1, and coaxial with the larger holes.

The heads of the per original grant two wood screws 8 only pass through the larger 0.5-inch diameter pre-drilled holes of the inner cylinder 1 and rest against the inner cylinder's inside wall in line with the smaller 0.25-inch diameter pre-drilled holes. The two plastic plugs 12 seal the two larger 0.5-inch diameter pre-drilled holes of the inner cylinder 1.

Free standing

Figure 10:
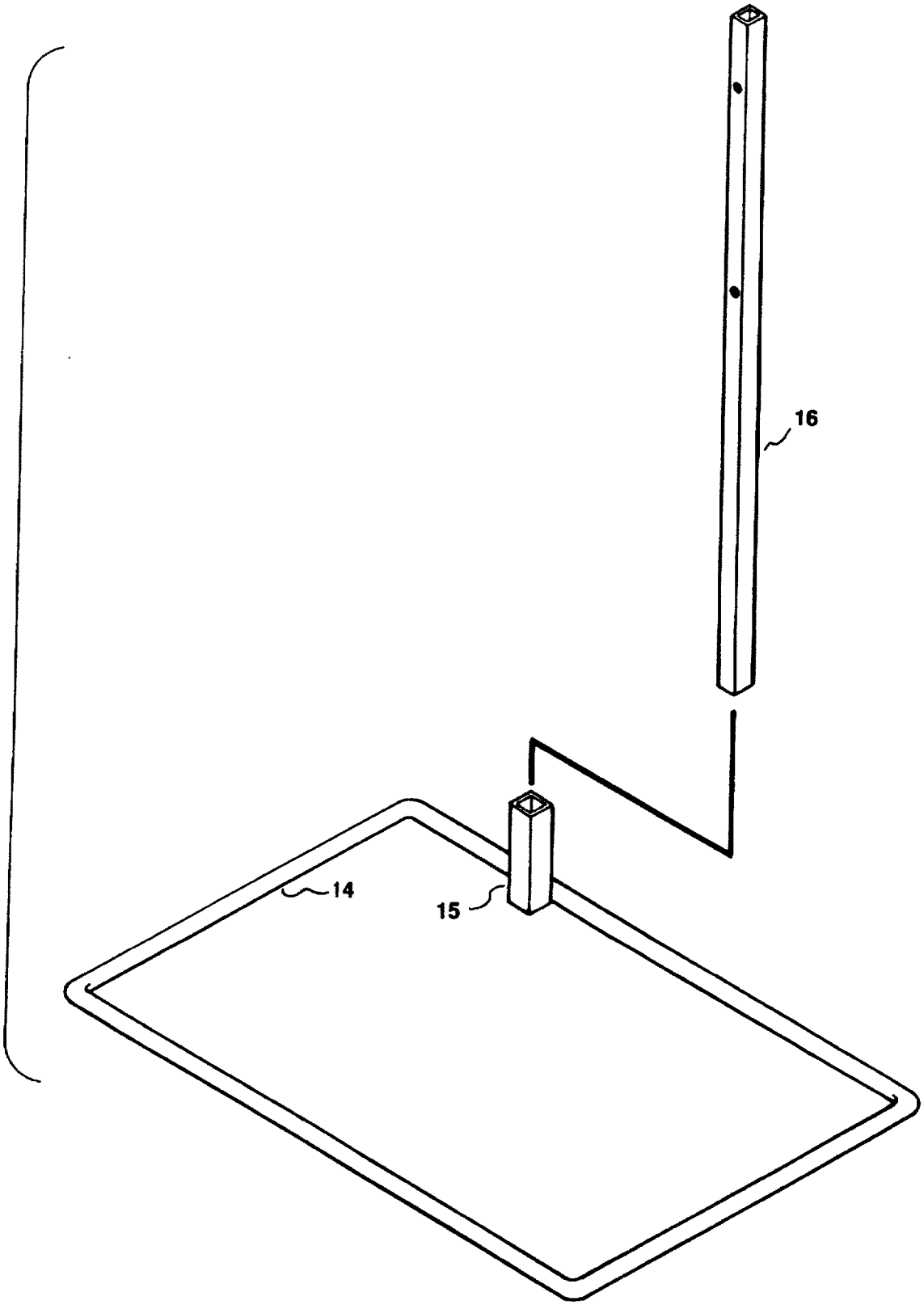
FIG. 10 is the exploded isometric view of the free standing base of the invention.
Figure 11:
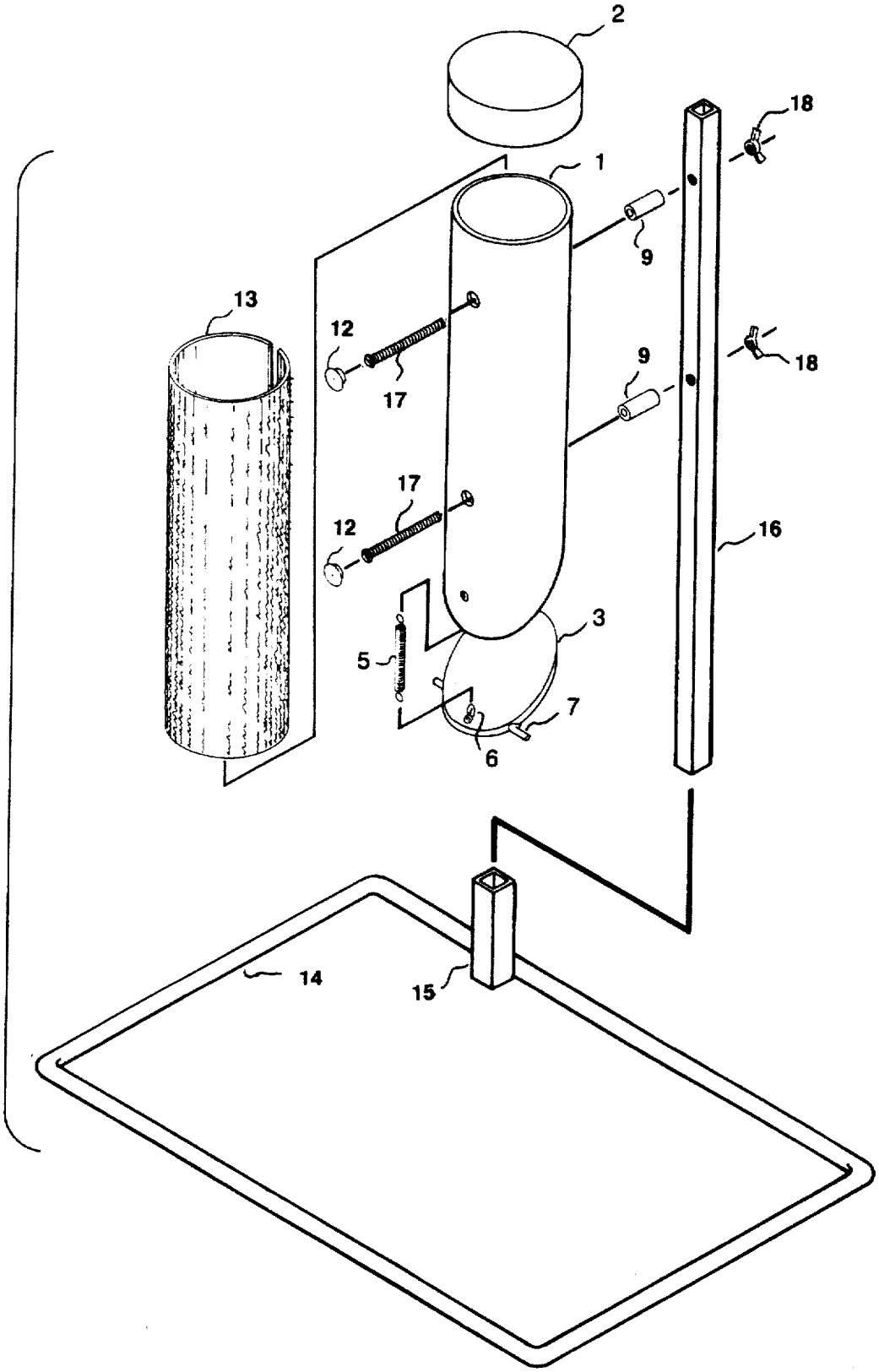
FIG. 11 is the exploded isometric view of the complete scratching post feeder mounted to the free standing base.

The inner cylinder 1 is secured to the vertical support square tubing 16 of the free standing base 14, 15, 16 (see FIGS. 10 and 11 showing the rectangular steel rod base 14 with weld-attached short vertical square tubing 15 and the vertical support square tubing 16). The two plastic spacers 9 are used to maintain a fixed distance between free standing base vertical support square tubing 16 and the inner cylinder 1. As with the wall mount version, this spacing is required so that the carpeted outer cylinder 13 can slide over the secured inner cylinder 1. The two threaded bolts 17 slide through pre-drilled holes of the inner cylinder 1 and on through the two plastic spacers 9 and finally through the vertical support square tube 16. The heads of the two threaded bolts 17 only pass through the larger 0.5-inch diameter pre-drilled holes of the inner cylinder 1 and rest against the inner cylinder's inside wall in line with the smaller 0.25-inch diameter pre-drilled holes. The two wing-nuts 18 are screwed onto the two threaded bolts 17 securing the inner cylinder 1 to the vertical support square tube 16. The two plastic plugs 12 seal the two larger 0.5-inch diameter pre-drilled holes of the inner cylinder 1.

The carpeted outer cylinder 13 (see FIGS. 3, 4, 5, 6, and 11), with its vertical slot or cut-out, slides over the mounted inner cylinder 1 and rests upon the steel support rod 7 of the inner cylinder's 1 lower lid 3. Dry cat food is placed inside the inner cylinder 1. The installation of the invention, the cat scratching post feeder, is complete once the plastic cap 2 is placed over the inner cylinder 1.

Scratching action of a cat upon the carpeted outer cylinder 13 exerts downward force through the steel support rod 7 to the spring-loaded lower lid 3 causing the lower lid 3 to open and dispense dry cat food.

The invention, the cat scratching post feeder is a dual function device: a scratching post and a pet-activated feeder.

While preferred embodiments of the present invention have been shown and described. herein, it is obvious that many structural details may be changed without departing from the spirit and scope of the appended claims. *Any changes, envisioned or actual, are limited only by the claims.* For example, the two plastic cable ties 4, which act as a hinge between the inner cylinder 1 and the lower lid 3, might be replaced by a metal strap hinge.

I claim:

1. A [cat] scratching post feeder comprising a wall mountable [dry food fillable inner cylinder] *first shell able to receive food* with a [spring-loaded hinged] *tension-loaded* [lower lid] *door,* [a steel support rod attached to the bottom of *at least one projection protruding from* the lower lid] *door,* and a [carpeted outer cylinder] *second shell with a surface that cats like to scratch* that slides over the [inner cylinder] *first shell* and rests upon the [steel support rod] *at least one projection* thereby creating a dual function device, [cat] scratcher and [pet-activated] feeder, which will dispense [dry cat] food whenever [a cat exerts] downward force *is exerted* on the [support rod] *at least one projection* by scratching the [carpeted outer cylinder] *second shell with a surface that cats like to scratch.*

2. A [cat] cat scratching post feeder comprising a free standing [platform, with a weld-attached vertically positioned short length of hollow tubing into which slides a separate longer length of predrilled tubing, a dry food fillable inner cylinder] *first shell able to receive food* with a [spring-loaded, hinged lower lid, a steel support rod attached to the bottom of] *tension-loaded door, at least one projection protruding from* the [lower lid] *door,* carpeted outer cylinder] *second shell with a surface that cats like to scratch* that slides over the [inner cylinder] *first shell* and rests upon the [steel support rod] *at least one projection ep* thereby creating a dual function device, [cat] scratcher and [pet-activated] feeder, which will dispense [dry cat] food whenever a cat exerts] downward force *is exerted* on [the steel support rod] *the at least one projection* by scratching the [carpeted outer cylinder] *second shell with a surface that cats like to scratch.*

3. A [cat] scratching post feeder as set forth in claims 1 or 2 wherein: said [steel support rod comprises a weld-attached metal washer for single rivet fastening to the underside of the inner cylinder's lower lid and said steel support rod is shaped with upward and outward bends at each of its two ends so as to follow the contour of the underside and sides of the lower lid door and] *at least one projection* protrude [outward] from the [lower lid at two opposing points] *door* thereby supporting the [carpeted outer cylinder which rests upon the two ends of the steel support rod] *second shell with a surfce that cats like to scratch.*

*4. A scratching post and feeder apparatus comprising:*

*a first shell able to receive food;*

*a door for the shell at one end of the shell;*

*means during the door closed;*

*at least one projection extending from the door;*

*a second shell received on the first shell and able to reciprocate along said first shell, whereby movement downwardly of the second shell on the first shell acts upon said at least one projection to open the door.*

*5. Apparatus as in claim 4, wherein the means urging the door closed is a spring.*

*6. Apparatus as in claim 5, wherein the spring is a coil spring mounted at one of its ends to the door and at another to said first shell.*

*7. Apparatus as in claim 4, wherein the second shell further comprises a surface that cats like to scratch.*

*8. Apparatus as in claim 7, wherein the surface is a carpet.*

*9. Apparatus as in claims 4 or 7, further comprising a cap to cover at least one of said shells.*

*10. Apparatus as in claim 9, further comprising means for mounting said apparatus on a surface.*

*11. Apparatus as in claims 4 or 7, further comprising means for mounting said apparatus on a surface.*

*12. Apparatus as in claim 4, wherein the at least one projection comprises a pair of posts extending from the door.*

* * * * *